United States Patent
Park et al.

(10) Patent No.: US 9,907,041 B2
(45) Date of Patent: Feb. 27, 2018

(54) RECEIVER AND METHOD FOR DETECTING SYNCHRONIZATION IN WIRELESS COMMUNICATION SYSTEM

(71) Applicants: Jeong-Soon Park, Seoul (KR); Hwan-Min Park, Gyeongsangnam-do (KR); Sang-Woo Kim, Seoul (KR); Myung-Joon Shim, Gyeonggi-do (KR); Suk-Bum Hong, Seoul (KR); Jong-Yoon Hwang, Gyeonggi-do (KR)

(72) Inventors: Jeong-Soon Park, Seoul (KR); Hwan-Min Park, Gyeongsangnam-do (KR); Sang-Woo Kim, Seoul (KR); Myung-Joon Shim, Gyeonggi-do (KR); Suk-Bum Hong, Seoul (KR); Jong-Yoon Hwang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 196 days.

(21) Appl. No.: 14/811,500

(22) Filed: Jul. 28, 2015

(65) Prior Publication Data
US 2016/0198425 A1    Jul. 7, 2016

(30) Foreign Application Priority Data
Jan. 2, 2015    (KR) .................. 10-2015-0000131

(51) Int. Cl.
| | |
|---|---|
| *H04L 12/28* | (2006.01) |
| *H04W 56/00* | (2009.01) |
| *H04B 1/7073* | (2011.01) |
| *H04B 1/7107* | (2011.01) |

(52) U.S. Cl.
CPC ........ *H04W 56/003* (2013.01); *H04B 1/7073* (2013.01); *H04B 1/71072* (2013.01)

(58) Field of Classification Search
CPC ........................................................ H04W 4/00
USPC ........................................................ 370/329
See application file for complete search history.

(56) References Cited

U.S. PATENT DOCUMENTS

| | | | |
|---|---|---|---|
| 7,400,894 B2 | 7/2008 | Ebner et al. | |
| 7,738,532 B2 | 6/2010 | Cheng et al. | |
| 7,813,311 B2 | 10/2010 | Dick et al. | |
| 7,817,592 B2 | 10/2010 | Yun et al. | |
| 8,265,560 B2 | 9/2012 | Pan | |
| 8,462,672 B2 | 6/2013 | Kim et al. | |

(Continued)

OTHER PUBLICATIONS

L. Hanzo et al., Multi-and Single-Carrier CDMA, Multi-User Detection, Space-Time Spreading Synchronisation and Standards, Wiley.

(Continued)

*Primary Examiner* — Dang Ton
(74) *Attorney, Agent, or Firm* — The Farrell Law Firm, P.C.

(57) ABSTRACT

The present disclosure provides a method and a receiver for detecting synchronization in a Time Division-Synchronous Code Division Multiple Access (TD-SCDMA) system. The receiver includes a reception unit that receives a synchronization signal including an interference signal from at least one adjacent cell; and a synchronization detector that cancels the interference signal included in the synchronization signal based on a serial interference cancellation, and detects the synchronization based on the synchronization signal, from which the interference signal is canceled.

18 Claims, 10 Drawing Sheets

(56) References Cited

U.S. PATENT DOCUMENTS

| | | |
|---|---|---|
| 8,494,070 B2 | 7/2013 | Luo et al. |
| 8,559,401 B2 | 10/2013 | Zeira et al. |
| 2005/0213529 A1* | 9/2005 | Chow .................... H04B 1/711 370/320 |
| 2009/0137241 A1 | 5/2009 | Yavuz et al. |
| 2013/0155883 A1 | 6/2013 | Bhattacharjee et al. |
| 2013/0231147 A1 | 9/2013 | Li et al. |
| 2014/0078961 A1 | 3/2014 | Shen et al. |
| 2015/0036621 A1* | 2/2015 | Shin .................... H04J 11/0036 370/329 |
| 2015/0078257 A1* | 3/2015 | Wu .................... H04L 25/0224 370/328 |

OTHER PUBLICATIONS

Markku Pukkila, Iterative Receivers and Multichannel Equalisation for Time Division Multiple Access Systems, Helsinki University of Technology Signal Processing Laboratory, Report 43, Oct. 10, 2003.

* cited by examiner

RECEIVER AND METHOD FOR DETECTING SYNCHRONIZATION IN WIRELESS COMMUNICATION SYSTEM

PRIORITY

This application claims the priority under 35 U.S.C. § 119(a) to Korean Application Serial No. 10-2015-0000131, which was filed in the Korean Intellectual Property Office on Jan. 2, 2015, the entire content of which is incorporated herein by reference.

BACKGROUND

1. Field of the Disclosure

The present disclosure relates generally to detecting synchronization in a wireless communication system, and more particularly, to a method and an apparatus for detecting synchronization in a Time Division-Synchronous Code Division Multiple Access (TD-SCDMA) system.

2. Description of the Related Art

TD-SCDMA technology is obtained by combining Time Division Duplexing (TDD) and Time Division Multiple Access (TDMA) technology with Synchronous CDMA technology. Accordingly, TD-SCDMA technology has unique advantages, such as flexible frequency allocation, implementation of a low-priced transmitter/receiver, evolution of a network from Global System for Mobile communications (GSM), and the like, as compared with other 3G technologies such as Wideband Code Division Multiple Access (WCDMA) and CDMA2000.

In CDMA, which is robust against multipath fading and interference, cells can be distinguished from each other by using a midamble code and a chip-level scramble code. A midamble code is a channel training sequence used for channel estimation, whereas a chip-level scramble code is used to scramble transmission code symbols so that transmission symbols may be close to white Gaussian noise.

Also, when a TD-SCDMA system is an intra-frequency network, cell recognition or synchronization detection may be implemented by SYNC_DL (a downlink synchronization code) in a downlink pilot time slot and midamble codes. Further, users of different cells can be recognized by a scramble code and a midamble code.

However, when intra-frequency interference exists in a TD-SCDMA system, the TD-SCDMA system uses a SYNC_DL (the downlink synchronization code) in the downlink pilot time slot, a midamble code, and the like, which may be interfered with by other adjacent cells.

In other words, in an environment in which multiple cells use an identical frequency, while a synchronization code transmitted through a midamble code and a pilot time slot is broadcast by a serving cell and adjacent cells, the relevant cell may be affected by other midamble codes or synchronization codes broadcast by the adjacent cells.

A receiver may independently estimate a channel and detect synchronization by using signals received from multiple adjacent cells. Such a method for estimating a channel and detecting synchronization may cause interference to the estimated channel response signal and the synchronization detection signal. In the worst case, due to the interference, the receiver may fail to detect the synchronization.

SUMMARY

An aspect of the present disclosure is to provide a method and an apparatus for detecting synchronization in order to limit intra-frequency interference in a TD-SCDMA system.

An aspect of the present disclosure provides a receiver and a method for cancelling interference in a received synchronization signal by using serial interference cancellation.

In accordance with an aspect of the present disclosure, an apparatus for detecting synchronization in a wireless communication system is provided. The apparatus may include a reception unit that receives a synchronization signal including an interference signal from at least one adjacent cell; and a synchronization detector that cancels the interference signal included in the synchronization signal based on a serial interference cancellation, and detects the synchronization based on the synchronization signal, from which the interference signal is canceled.

In accordance with another aspect of the present disclosure, a method for detecting synchronization by a receiver in a wireless communication system is provided. The method may include receiving a synchronization signal including an interference signal from at least one adjacent cell; canceling the interference signal included in the synchronization signal based on a serial interference cancellation; and detecting the synchronization based on the synchronization signal, from which the interference signal is canceled. In accordance with another aspect of the present disclosure, a receiver for detecting synchronization in a wireless communication system is provided. The receiver includes a chipset configured to cancel, based on a serial interference cancellation, an interference signal included in a synchronization signal received from at least one adjacent cell; and detect the synchronization based on the synchronization signal, from which the interference signal is canceled.

The chipset is further configured to estimate a channel, remove noise from the estimated channel and reconstruct at least one of a synchronization signal and an interference signal based on the estimated channel, from which the noise is removed.

The chipset is further configured to cancel the reconstructed interference signal from the reconstructed synchronization signal.

The chipset is further configured to perform an FFT operation on the received synchronization signal and multiply the received synchronization signal by an inverse of a synchronization signal in a frequency domain.

The chipset is further configured to perform an IFFT operation on the estimated channel and in a time domain, compare power values of signal taps of the estimated channel with a threshold and nulls to zero signal taps having power values less than the threshold.

The chipset is further configured to perform an IFFT operation on the estimated channel and in a time domain, null to zero signal taps having lengths exceeding a maximum length of the channel among signal taps of the estimated channel.

The chipset is further configured to determine a correlation power of the received synchronization signal.

The chipset is further configured to arrange correlation power values of the received synchronization signal and determine a predetermined number of correlation power values in order of the arrangement.

The chipset is further configured to set to a maximum delay, a time period according to which the correlation power of the received synchronization signal is determined.

The synchronization signal is located in a Downlink Pilot Time Slot (DwPTS), which discriminates between cells, between a first time slot and a second time slot and the DwPTS comprises a Guard Period (GP) of 32 chips and a SYNC_DL of 64 chips.

BRIEF DESCRIPTION OF THE DRAWINGS

The above and other aspects, features, and advantages certain embodiments of the present disclosure will be more apparent from the following detailed description taken in conjunction with the accompanying drawings, in which.

DETAILED DESCRIPTION OF EMBODIMENTS

Hereinafter, various embodiments of the present disclosure will be described in detail with reference to the accompanying drawings. Further, in the following description of the present disclosure, detailed descriptions of known functions or configurations incorporated herein may be omitted when such a description may obscure the subject matter of the present disclosure. The terms which will be described below are terms defined in consideration of the functions in the present disclosure, and may be different according to users, intentions of the users, or customs. Accordingly, the definitions of the terms should be made on the basis of the overall context of the embodiments of the present disclosure.

A method and an apparatus for detecting synchronization in a wireless communication system according to an embodiment of the present disclosure is described as follows with reference to FIG. 1.

Figure 1:
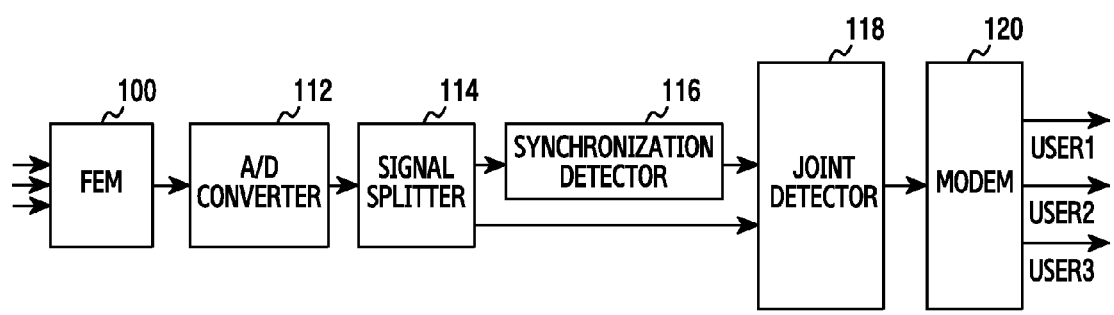
FIG. 1 is a block diagram illustrating a configuration of a receiver in a TD-SCDMA system according to an embodiment of the present disclosure.

FIG. 1 is a block diagram illustrating a configuration of a receiver in a TD-SCDMA system according to an embodiment of the present disclosure.

Referring to FIG. 1, a receiver includes a Front-End Module (FEM) 100, an Analog-to-Digital (A/D) converter 112, a signal splitter 114, a synchronization detector 116, a joint detector 118, and a MODulator/DEModulator (modem) 120.

The FEM 100 processes a signal received via an antenna. For example, the FEM 100 may filter the received signal and may amplify the filtered signal, and then output the amplified received signal to the A/D converter 112. According to an embodiment of the present disclosure, the FEM 100 may include a Band Pass Filter (BFP) and a low-noise amplifier.

The A/D converter 112 converts an analog signal received from the FEM 100 into a digital signal, and provides the digital signal to the signal splitter 114.

The signal splitter 114 demultiplexes an input data stream corresponding to the digital signal received from the A/D converter 112, and outputs the demultiplexed input data stream to the joint detector 118 and the synchronization detector 116. For example, the signal splitter 114 may transmit a midamble signal or a synchronization signal (e.g., UpLink (UL)/DownLink (DL) synchronization signals) to the synchronization detector 116, and may output data to the joint detector 118.

The synchronization detector 116 estimates a channel and detects synchronization by using midamble data and synchronization data (e.g., SYNC_DL and SYNC_UL). According to an embodiment of the present disclosure, the synchronization detector 116 cancels interference included the synchronization signal on the basis of an Interference Cancellation (IC) scheme in order to improve synchronization detection performance. One of serial IC, parallel IC, iterative IC and partial IC may be used as the IC scheme. The synchronization detector 116 is described in detail below with reference to FIGS. 2 and 3.

The TD-SCDMA system has a midamble code, the length of which is equal to 128 chips and is twice as long as the length of SYNC_DL (e.g., 64 chips), and thus can provide more accurate wave detection performance. However, when multiple midambles, which are cyclically shifted according to data allocation, are transmitted by a base station, multiple Carrier-to-Interference Ratios (CIRs) are detected by a reception side, and a range may be limited, in which estimation is capable of being performed, according to a channel length. The range may be limited according to the channel length.

Also, in the TD-SCDMA system, a channel is estimated by using a midamble obtained through cyclic shift. Accordingly, when a dominant path (e.g., a first path in a multipath channel) is missed in an interference environment, serious performance degradation may occur.

Therefore, according to an embodiment of the present disclosure, synchronization may be detected by using SYNC_DL instead of a midamble.

The joint detector 118 splits a number 'k' of data streams with respect to all users in the system. An output of the joint detector 118 is forwarded to the modem 120.

The modem 120 decodes data from the joint detector 118 according to a relevant decoding scheme.

Figure 2:
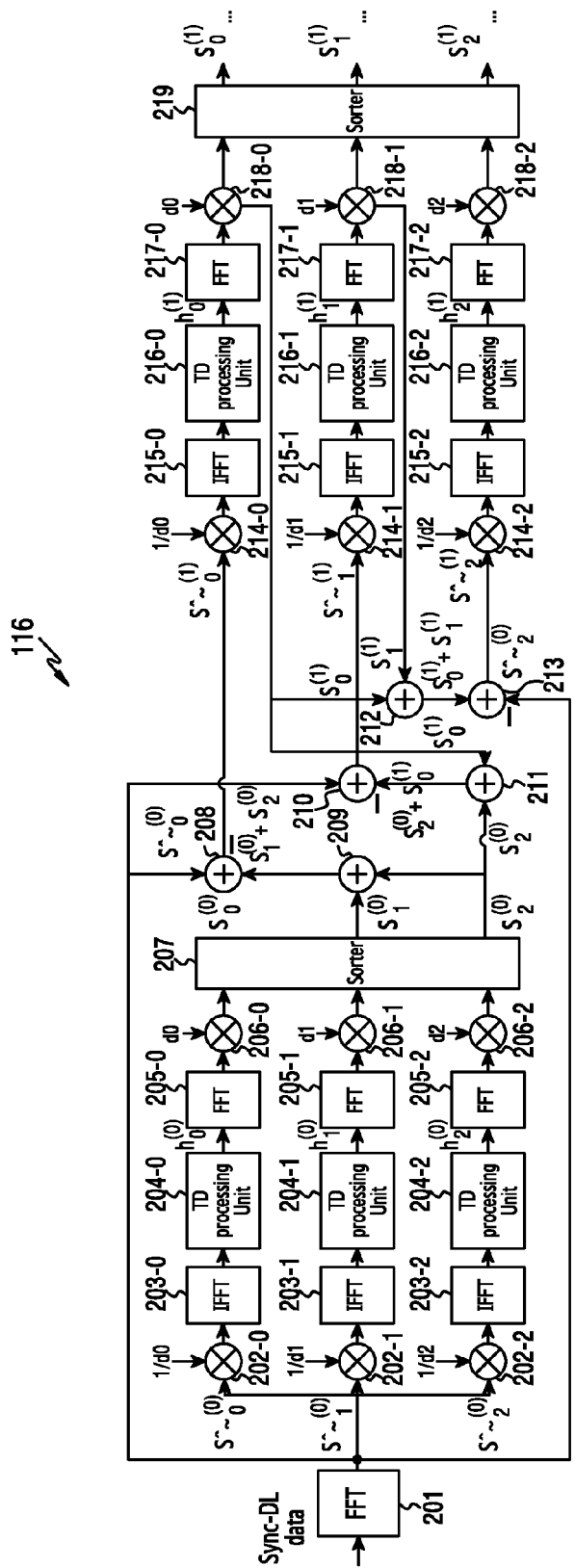
FIG. 2 is a block diagram illustrating a configuration of a synchronization detector of the receiver illustrated in FIG. 1 according to an embodiment of the present disclosure.

FIG. 2 is a block diagram illustrating a configuration of the synchronization detector 116 of the receiver illustrated in FIG. 1 according to an embodiment of the present disclosure.

Referring to FIG. 2, the synchronization detector 116 includes a first Fast Fourier Transform (FFT) 201, multiple first multipliers 202-0 to 202-2, multiple first Inverse Fast Fourier Transforms (IFFTs) 203-0 to 203-2, multiple first Time Domain (TD) processing units 204-0 to 204-2, multiple second FFTs 205-0 to 205-2, multiple second multipliers 206-0 to 206-2, a first sorter 207, multiple adders 208, 209, 210, 211, 212 and 213, multiple third multipliers 214-0 to 214-2, multiple second IFFTs 215-0 to 215-2, multiple second TD processing units 216-0 to 216-2, multiple third FFTs 217-0 to 217-2, multiple third multipliers 218-0 to 218-2, and a second sorter 219.

The first FFT 201 performs an FFT operation on DL synchronization signals (each named SYNC_DL) received from multiple cells, and outputs $\hat{S}_{\bar{0}^{(0)}}$, $\hat{S}_{\bar{1}^{(0)}}$ and $\hat{S}_{\bar{2}^{(0)}}$ as a result of the FFT operation to the multiple first multipliers 202-0 to 202-2. Here, $\hat{S}_{\bar{0}^{(0)}}$ represents a synchronization signal received from the first cell, $\hat{S}_{\bar{1}^{(0)}}$ represents a synchronization signal received from the second cell, and $\hat{S}_{\bar{2}^{(0)}}$ represents a synchronization signal received from the third cell.

In the TD-SCDMA system, where multiple cells use an identical frequency, terminals located at the edge of a cell may be interfered with by synchronization signals transmitted by adjacent cells. Also, a signal received by each of the terminals located at the edge of the cell, through a wireless channel, may include Additive White Gaussian Noise (AWGN). Although the output signals from the first FFT 201 are respectively represented by $\hat{S}_{\bar{0}^{(0)}}$, $\hat{S}_{\bar{1}^{(0)}}$ and $\hat{S}_{\bar{2}^{(0)}}$, a terminal actually receives a signal obtained by adding $\hat{S}_{\bar{0}^{(0)}}$, $\hat{S}_{\bar{1}^{(0)}}$ and $\hat{S}_{\bar{2}^{(0)}}$ together.

The multiple first multipliers 202-0 to 202-2 multiply the inverses of synchronization codes $d_0$, $d_1$ and $d_2$ of the relevant cells by the output signals from the first FFT 201, respectively, and output results of the multiplications to the multiple first IFFTs 203-0 to 203-2, respectively. For example, the multiplier 202-0 multiplies $\hat{S}_{\bar{0}^{(0)}}$ including $\hat{S}_{\bar{1}^{(0)}}$ and $\hat{S}_{\bar{2}^{(0)}}$ by an inverse $1/d_0$ of the synchronization signal of the first cell. The multiplier 202-1 multiplies $\hat{S}_{\bar{1}^{(0)}}$ including $\hat{S}_{\bar{0}^{(0)}}$ and $\hat{S}_{\bar{2}^{(0)}}$ by an inverse $1/d_1$ of the synchronization signal of the second cell. The multiplier 202-2 multiplies $\hat{S}_{\bar{2}^{(0)}}$ including $\hat{S}_{\bar{0}^{(0)}}$ and $\hat{S}_{\bar{1}^{(0)}}$ by an inverse $1/d_2$ of the synchronization signal of the third cell.

The multiple first IFFTs 203-0 to 203-2 perform IFFTs on output signals from the multiple first multipliers 202-0 to 202-2 and output results of performing the IFFTs to the multiple first TD processing units 204-0 to 204-2, respectively.

Here, an output signal of the first IFFT 203-0 is a channel estimation signal $h_0^{(0)}$, an output signal of the first IFFT 203-1 is a channel estimation signal $h_1^{(0)}$, and an output signal of the first IFFT 203-2 is a channel estimation signal $h_2^{(0)}$.

The multiple first TD processing units 204-0 to 204-2 remove noises (e.g., AWGN) from the channel estimation signals $h_0^{(0)}$, $h_1^{(0)}$ and $h_2^{(0)}$ provided by the multiple first IFFTs 203-0 to 203-2, respectively. For example, the channel estimation signals $h_0^{(0)}$, $h_1^{(0)}$ and $h_2^{(0)}$ include signal taps corresponding to an FFT size, and noises may be removed from the channel)) estimation signals $h_0^{(0)}$, $h_1^{(0)}$ and $h_2^{(0)}$ by nulling to zero signal taps having noise power values less than a predetermined threshold. For example, when an FFT size is equal to 256, signal taps are nulled to zero which, among 256 signal taps, have noise power values less than a predetermined threshold.

Here, the FFT size is larger than or twice larger than the length of a synchronization signal (e.g., the length of SYNC_DL is equal to 96 chips). For example, when the length of a synchronization signal is equal to 96 chips, the FFT size may be equal to K=128 ($=2^7$) or K=256 ($=2^8$).

According to another embodiment of the present disclosure, each of the multiple first TD processing units 204-0 to 204-2 removes noise included in a channel estimation signal by nulling to zero, a signal tap having a length at least equal to a maximum length (e.g., 32 chips, the length of a Guard Period (GP) in a subframe) of a channel.

The multiple second FFTs 205-0 to 205-2 perform FFTs on channel)) estimation signals $h_0^{(0)}$, $h_1^{(0)}$ and $h_2^{(0)}$ obtained by removing the noises that are output from the multiple first TD processing units 204-0 to 204-2, respectively.

The multiple second multipliers 206-0 to 206-2 multiply the channel estimation signals $h_0^{(0)}$, $h_1^{(0)}$ and $h_2^{(0)}$ obtained by removing the noises by the synchronization codes $d_0$, $d_1$ and $d_2$ of the relevant cells, respectively, and outputs reconstructed synchronization signals $S_0^{(0)}$, $S_1^{(0)}$ and $S_2^{(0)}$ to the first sorter 207.

For example, the multiplier 206-0 multiplies the channel estimation signal $h_0^{(0)}$, which has been obtained by removing the noise, by the synchronization signal $d_0$ of the first cell, and outputs the reconstructed synchronization signal $S_0^{(0)}$ to the first sorter 207. The multiplier 206-1 multiplies the channel estimation signal $h_1^{(0)}$, which has been obtained by removing the noise, by the synchronization signal $d_1$ of the second cell, and outputs the reconstructed synchronization signal $S_1^{(0)}$ to the first sorter 207. The multiplier 206-2 multiplies the channel estimation signal $h_2^{(0)}$, which has been obtained by removing the noise, by the synchronization signal $d_2$ of the third cell, and outputs the reconstructed synchronization signal $S_2^{(0)}$ to the first sorter 207.

The first sorter 207 provides $S_1^{(0)}$ and $S_2^{(0)}$ to the relevant adders 209 and 211, respectively.)

The adder 209 adds $S_1^{(0)}$ and $S_2^{(0)}$ together, and provides a result of the addition to the adder 208.

The adder 208 removes $\hat{S}_{\bar{1}^{(0)}}$ and $\hat{S}_{\bar{2}^{(0)}}$ from $\hat{S}_{\bar{0}^{(0)}}$ by using $\hat{S}_{\bar{0}^{(0)}}$ from the first FFT 201 and the result from the adder 209. Specifically, the adder 208 removes the synchronization signals of the second cell and the third cell from the received synchronization signal, and then outputs, to the third multiplier 214-0, a result $\hat{S}_{\bar{0}^{(*)}}$ of removing the synchronization signals.

The third multiplier 214-0 multiplies $\hat{S}_{\bar{0}^{(*)}}$ by the inverse $1/d_0$ of the synchronization signal of the first cell, and outputs a result of the multiplication to the second IFFT 215-0.

The second IFFT 215-0 performs an IFFT on the signal received from the third multiplier 214-0, and outputs, to the second TD processing unit 216-0, a result of the IFFT.

The second TD processing unit 216-0 removes noise from a signal, which has been received from the second IFFT 215-0, in the same method as that of the first TD processing unit 204-0, and then provides, to the third FFT 217-0, a result $h_0^{(1)}$ of removing the noise.

The third FFT 217-0 performs an FFT on the signal received from the second TD processing unit 216-0, and outputs, to the third multiplier 218-0, a result of the FFT.

The third multiplier 218-0 multiplies the signal received from the third FFT 217-0 by the synchronization signal of the first cell, and outputs a result of the multiplication to the second sorter 219 and the adders 211 and 212. An output signal of the third multiplier 218-0 may be $S_0^{(1)}$ obtained by removing noise from $\hat{S}_{\bar{0}^{(*)}}$.

The adder 211 adds $S_0^{(1)}$ from the third multiplier 218-0 and $S_2^{(0)}$ from the first sorter 207 together, and outputs a result of the addition to the adder 210.

The adder 210 removes $S_0^{(1)}$ and $S_2^{(0)}$ from $\hat{S}_{\bar{1}^{\leftarrow}}$, which has been provided by the first FFT 201, and outputs, to the third multiplier 214-1, a result $\hat{S}_{\bar{1}^{\leftarrow}}$ of removing $S_0^{(1)}$ and $S_2^{(0)}$.

The third multiplier 214-1 multiplies $\hat{S}_{\bar{1}^{\leftarrow}}$ by the inverse 1/d1 of the synchronization signal of the second cell, and outputs a result of the multiplication to the second IFFT 215-1.

The second IFFT 215-1 performs an IFFT on the signal received from the third multiplier 214-1, and outputs, to the second TD processing unit 216-1, a result of the IFFT.

The second TD processing unit 216-1 removes noise from the signal, which has been received from the second IFFT 215-1, in the same method as that of the first TD processing unit 204-1, and then provides, to the third FFT 217-1, a result $h_1^{(1)}$ of removing the noise.

The third FFT 217-1 performs an FFT on the signal received from the second TD processing unit 216-1, and outputs, to the third multiplier 218-1, a result of the FFT.

The third multiplier 218-1 multiplies the signal received from the third FFT 217-1 by the synchronization signal d1 of the second cell, and outputs a result of the multiplication to the second sorter 219 and the adder 212. An output signal of the third multiplier 218-1 may be $S_1^{(1)}$ obtained by removing noise from $\hat{S}_{\bar{1}^{\leftarrow}}$.

The adder 212 adds $S_1^{(1)}$ from the third multiplier 218-1 and $S_0^{(1)}$ from the third multiplier 218-0, and outputs a result of the addition to the adder 213.

The adder 213 removes the reconstructed $S_0^{(1)}$ and $S_1^{(1)}$ from $\hat{S}_{\bar{2}^{\leftarrow}}$, which has been provided by the first FFT 201, and outputs, to the third multiplier 214-2, a result of the removal of the reconstructed $S_0^{(1)}$ and $S_1^{(1)}$.

The third multiplier 214-2 multiplies $\hat{S}_{\bar{2}^{\leftarrow}}$ by the inverse 1/d2 of the synchronization signal of the third cell, and outputs a result of the multiplication to the second IFFT 215-2.

The second IFFT 215-2 performs an IFFT on the signal received from the third multiplier 214-2, and outputs, to the second TD processing unit 216-2, a result of the IFFT.

The second TD processing unit 216-2 removes noise from the signal, which has been received from the second IFFT 215-2, in the same method as that of the first TD processing unit 204-2, and then provides, to the third FFT 217-2, a result $h_2^{(1)}$ of removing the noise.

The third FFT 217-2 performs an FFT on the signal received from the second TD processing unit 216-2, and outputs, to the third multiplier 218-2, a result of the FFT.

The third multiplier 218-2 multiplies the signal, which has been received from the third FFT 217-2, by the synchronization signal d2 of the third cell, and outputs a result $h_2^{(1)}$ of the multiplication to the second sorter 219.

Figure 3:
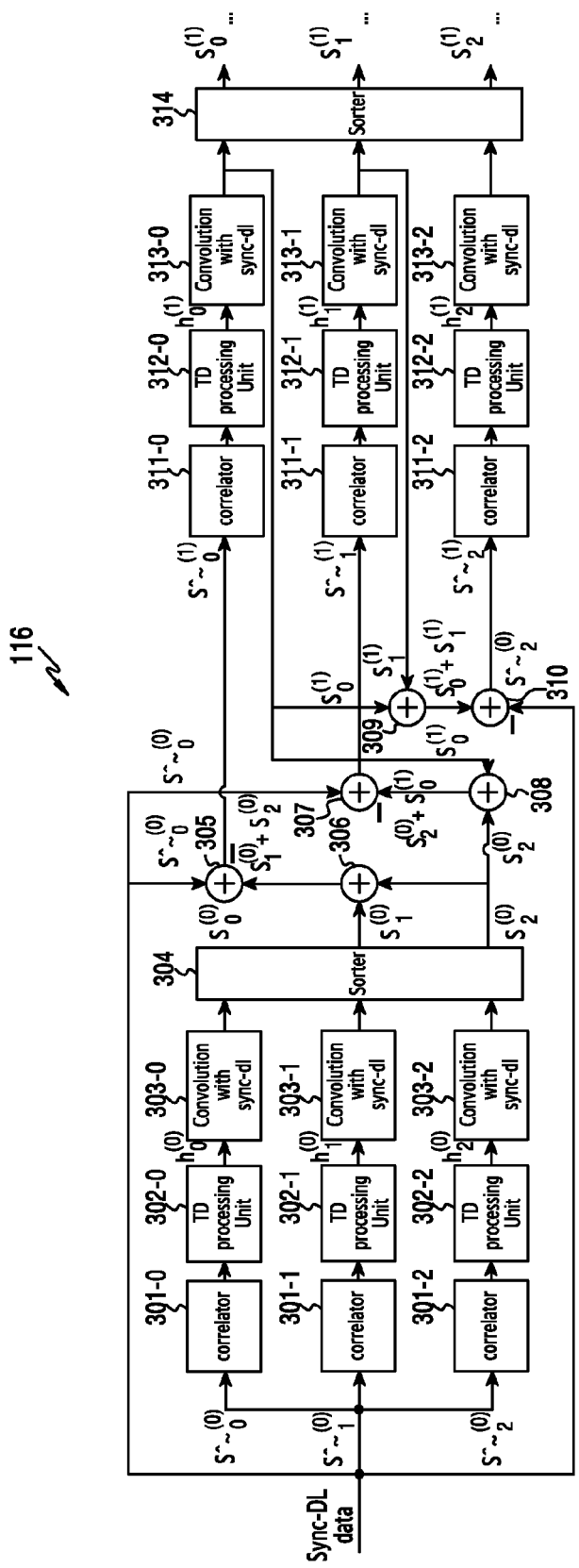
FIG. 3 is a block diagram illustrating a configuration of a synchronization detector of the receiver illustrated in FIG. 1 according to an embodiment of the present disclosure.

FIG. 3 is a block diagram illustrating a configuration of a synchronization detector of the receiver illustrated in FIG. 1 according to an embodiment of the present disclosure.

Referring to FIG. 3, the synchronization detector 116 includes multiple first correlators 301-0 to 301-2, multiple first TD processing units 302-0 to 302-2, multiple first convolution calculators 303-0 to 303-2, a first sorter 304, multiple adders 305, 306, 307, 308, 309 and 310, multiple second correlators 311-0 to 311-2, multiple second TD processing units 312-0 to 312-2, multiple second convolution calculators 313-0 to 313-2, and a second sorter 314.

In an environment in which multiple cells use an identical frequency, terminals located at the edge of a cell may be interfered with by synchronization signals transmitted by adjacent cells. Also, a signal received by each of the terminals located at the edge of the cell through a wireless channel may include AWGN. Although received synchronization signals are respectively represented by $\hat{S}_{\bar{0}^{\leftarrow}}$, $\hat{S}_{\bar{1}^{\leftarrow}}$ and $\hat{S}_{\bar{2}^{\leftarrow}}$, a terminal actually receives a signal obtained by adding $\hat{S}_{\bar{0}^{\leftarrow}}$, $\hat{S}_{\bar{1}^{\leftarrow}}$ and $\hat{S}_{\bar{2}^{\leftarrow}}$ together.

The multiple first correlators 301-0 to 301-2 acquire channel estimation signals by performing correlations by using a synchronization code set and then output the acquired channel estimation signals to the multiple first TD processing units 302-0 to 302-2, respectively.

The multiple first TD processing units 302-0 to 302-2 remove noises (e.g., AWGN) from the channel estimation signals provided by the multiple first correlators 301-0 to 301-2. For example, the multiple first TD processing units 302-0 to 302-2 may arrange correlation power values, and then may regard, as channel power, only correlation power having a higher priority than that of a threshold. Also, a time period for performing correlation, namely, a window range, may be set to a maximum delay.

Here, an output signal of the first TD processing unit 302-0 is a channel estimation signal $h_0^{(0)}$, an output signal of the first TD processing unit 302-1 is a channel estimation signal $h_1^{(0)}$, and an output signal of the first TD processing unit 302-2 is a channel estimation signal $h_2^{(0)}$.

The multiple first convolution calculators 303-0 to 303-2 convolve the channel estimation signals obtained by removing the noises with synchronization codes $d_0$, $d_1$ and $d_2$ of the relevant cells, respectively, and output results of the convolutions to the first sorter 304. Specifically, the multiple first convolution calculators 303-0 to 303-2 convolve channel estimation values with the relevant synchronization codes and thereby reconstruct relevant synchronization signals $S_0^{(0)}$, $S_1^{(0)}$ and $S_2^{(0)}$, respectively.

The first sorter 304 provides $S_1^{(0)}$ and $S_2^{(0)}$ to the relevant adders 306 and 308, respectively.

The adder 306 adds $S_1^{(0)}$ and $S_2^{(0)}$ together, and provides a result of the addition to the adder 305.

The adder 305 removes $S_1^{(0)}$ and $S_2^{(0)}$ from $\hat{S}_{\bar{0}^{\leftarrow}}$ by using $\hat{S}_{\bar{0}^{\leftarrow}}$ and the result from the adder 306. Specifically, the adder 305 removes the synchronization signals of the second cell and the third cell from the received synchronization signal, and then outputs, to the second correlator 311-0, a result $\hat{S}_{\bar{0}^{\leftarrow}}$ of removing the synchronization signals.

The second correlator 311-0 performs correlation, and outputs, to the second TD processing unit 312-0, a result of the correlation.

The second TD processing unit 312-0 removes noise from the received signal in the same method as that of the first TD processing unit 302-0, and then provides, to the second convolution calculator 313-0, a result $h_0^{(1)}$ of removing the noise.

The second convolution calculator 313-0 convolves the signal, which has been received from the second TD processing unit 312-0, with the relevant synchronization code, and outputs a result $S_0^{(1)}$ of the convolution to the second sorter 314 and the adders 308 and 309. $S_0^{(1)}$ may be the synchronization signal of the first cell, which is reconstructed after noise is moved from $\hat{S}_{\overline{0}^{(1)}}$.

The adder 308 adds, together, the reconstructed $S_0^{(1)}$, which has been received from the second convolution calculator 313-0, and the synchronization signal $S_2^{(0)}$ of the second cell from the first sorter 304, and outputs a result of the addition to the adder 307.

The adder 307 removes the reconstructed $S_0^{(1)}$ and $S_2^{(0)}$ from $\hat{S}_{\overline{1}^{(1)}}$, and outputs, to the second correlator 311-1, a result $\hat{S}_{\overline{1}^{(1)}}$ of removing the reconstructed $S_0^{(1)}$ and $S_2^{(0)}$.

The second correlator 311-1 performs correlation, and outputs, to the second TD processing unit 312-1, a result of the correlation.

The second TD processing unit 312-1 removes noise from the received signal in the same method as that of the first TD processing unit 302-1, and then provides, to the second convolution calculator 313-1, a result $h_1^{(1)}$ of removing the noise.

The second convolution calculator 313-1 convolves the signal, which has been received from the second TD processing unit 312-1, with the relevant synchronization code, and outputs a result $S_1^{(1)}$ of the convolution to the second sorter 314 and the adder 309. $S_1^{(1)}$ may be the synchronization signal of the second cell which is reconstructed after noise is removed from $\hat{S}_{\overline{1}^{(1)}}$.

The adder 309 adds, together, the reconstructed $S_1^{(1)}$, which has been received from the second convolution calculator 313-1, and the reconstructed $S_0^{(1)}$ from the second convolution calculator 313-0, and outputs a result of the addition to the adder 310.

The adder 310 removes $S_0^{(1)}$ and $S_1^{(1)}$ from $\hat{S}_{\overline{2}^{(1)}}$, and outputs, to the second correlator 311-2, a result $\hat{S}_{\overline{2}^{(1)}}$ of removing $S_0^{(1)}$ and $S_1^{(1)}$.

The second correlator 311-2 performs correlation, and outputs, to the second TD processing unit 312-2, a result of the correlation.

The second TD processing unit 312-2 removes noise from the received signal in the same method as that of the first TD processing unit 302-2, and then provides, to the second convolution calculator 313-2, a result $h_2^{(1)}$ of removing the noise.

The second convolution calculator 313-2 convolves the signal, which has been received from the second TD processing unit 312-2, with the relevant synchronization code, and outputs a result $S_2^{(1)}$ of the convolution to the second sorter 314.

In FIGS. 2 and 3, a superscript signifies the number of channel estimation and noise removal steps, and subscripts 0, 1 and 2 signify cell indices.

Specifically, in procedures for noise removal and cancellation of interference from a synchronization signal as illustrated in FIGS. 2 and 3, the receiver estimates a channel with respect to each cell, cancels interference from the estimated channel, and reconstructs respective synchronization signals $S_0^{(0)}$, $S_1^{(0)}$ and $S_2^{(0)}$. Then, the receiver removes, from a received synchronization signal, the reconstructed synchronization signals of the second cell and the third cell, and performs channel estimation on a synchronization signal $\hat{S}_{\overline{0}^{(1)}}$ of the first cell obtained by removing the reconstructed synchronization signals of the second cell and the third cell, and cancels interference from the estimated channel.

Then, the receiver again performs channel estimation on a synchronization signal $\hat{S}_{\overline{1}^{(1)}}$ of the second cell obtained by removing the synchronization signal $\hat{S}_{\overline{0}^{(1)}}$ of the first cell and the once-reconstructed synchronization signal $S_2^{(0)}$ of the third cell, which are repeatedly reconstructed signals, from the received synchronization signal. Next, the receiver cancels interference from the estimated channel.

Then, the receiver again performs channel estimation on a synchronization signal $\hat{S}_{\overline{2}^{(1)}}$ of the third cell obtained by removing the synchronization signal $\hat{S}_{\overline{0}^{(1)}}$ of the first cell and the repeatedly-reconstructed $\hat{S}_{\overline{1}^{(1)}}$ of the second cell, which are repeatedly reconstructed signals, from the received synchronization signal. Next, the receiver cancels interference from the estimated channel.

Although cancellation of an interference signal from a synchronization signal in view of three cells according to an embodiment of the present disclosure has been described hereinabove with reference to FIGS. 2 and 3, embodiments of the present disclosure are not limited to three cells. Accordingly, it is possible to cancel interference from any number 'N' of cells on the basis of the description of an embodiment of the present disclosure with reference to FIGS. 2 and 3.

Figure 4:
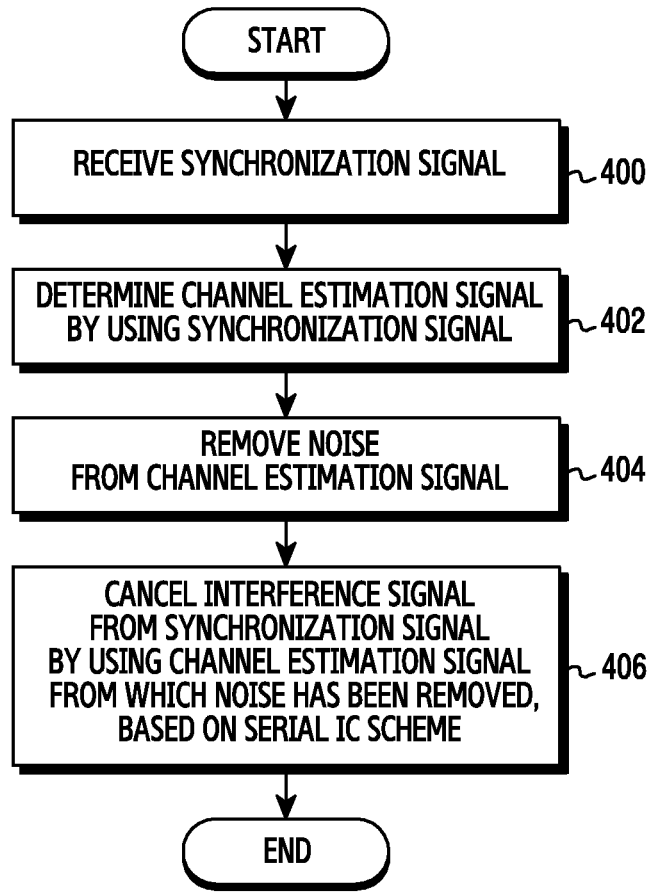
FIG. 4 is a flowchart illustrating the detection of synchronization by a receiver according to an embodiment of the present disclosure.

FIG. 4 is a flowchart illustrating the detection of synchronization by a receiver according to an embodiment of the present disclosure.

Referring to FIG. 4, in step 400, the receiver receives a synchronization signal including interference signals of adjacent cells.

In step 402, the receiver performs channel estimation by using the synchronization signal. For example, the channel estimation may be performed according to a Least Square (LS) estimation scheme. However, embodiments of the present disclosure are not limited to channel estimation performed according to the LS estimation scheme.

In step 404, the receiver removes noise from the estimated channel. For example, the receiver may suppress noise included in a channel by nulling to zero signal taps having noise power values less than a predetermined threshold in the time domain, or by nulling to zero signal taps having lengths at least equal to a maximum length of a channel, or by arranging correlation power values and then considering, as channel power, only correlation power having a higher priority than that of a threshold, or by setting a range of a time period for performing correlation to a maximum delay time period.

In step 406, the receiver cancels an interference signal from the synchronization signal by using a channel estimation signal, from which the noise has been removed, according to the serial IC scheme.

For example, the receiver may reconstruct a synchronization signal of each cell by using the channel estimation for each cell, and then may determine a synchronization signal of the first cell by removing the reconstructed synchronization signals of the second cell and the third cell from the received synchronization signal.

According to an embodiment of the present disclosure, the receiver may perform channel estimation on the determined synchronization signal of the first cell, and may repeatedly reconstruct the synchronization signal of the first cell by using the estimated channel.

The receiver may determine a synchronization signal of the second cell by removing, from the received synchronization signal, the determined synchronization signal of the first cell or the repeatedly-reconstructed synchronization signal of the first cell and the reconstructed synchronization signal of the third cell.

According to an embodiment of the present disclosure, the receiver may perform channel estimation on the determined synchronization signal of the second cell, and may repeatedly reconstruct the synchronization signal of the second cell by using the estimated channel.

Thereafter, the receiver may determine a synchronization signal of the third cell by removing, from the received synchronization signal, the repeatedly-reconstructed synchronization signal of the first cell and the repeatedly-reconstructed synchronization signal of the second cell.

According to an embodiment of the present disclosure, the receiver may perform channel estimation on the determined synchronization signal of the third cell, and may repeatedly reconstruct the synchronization signal of the third cell by using the estimated channel.

Figure 5:
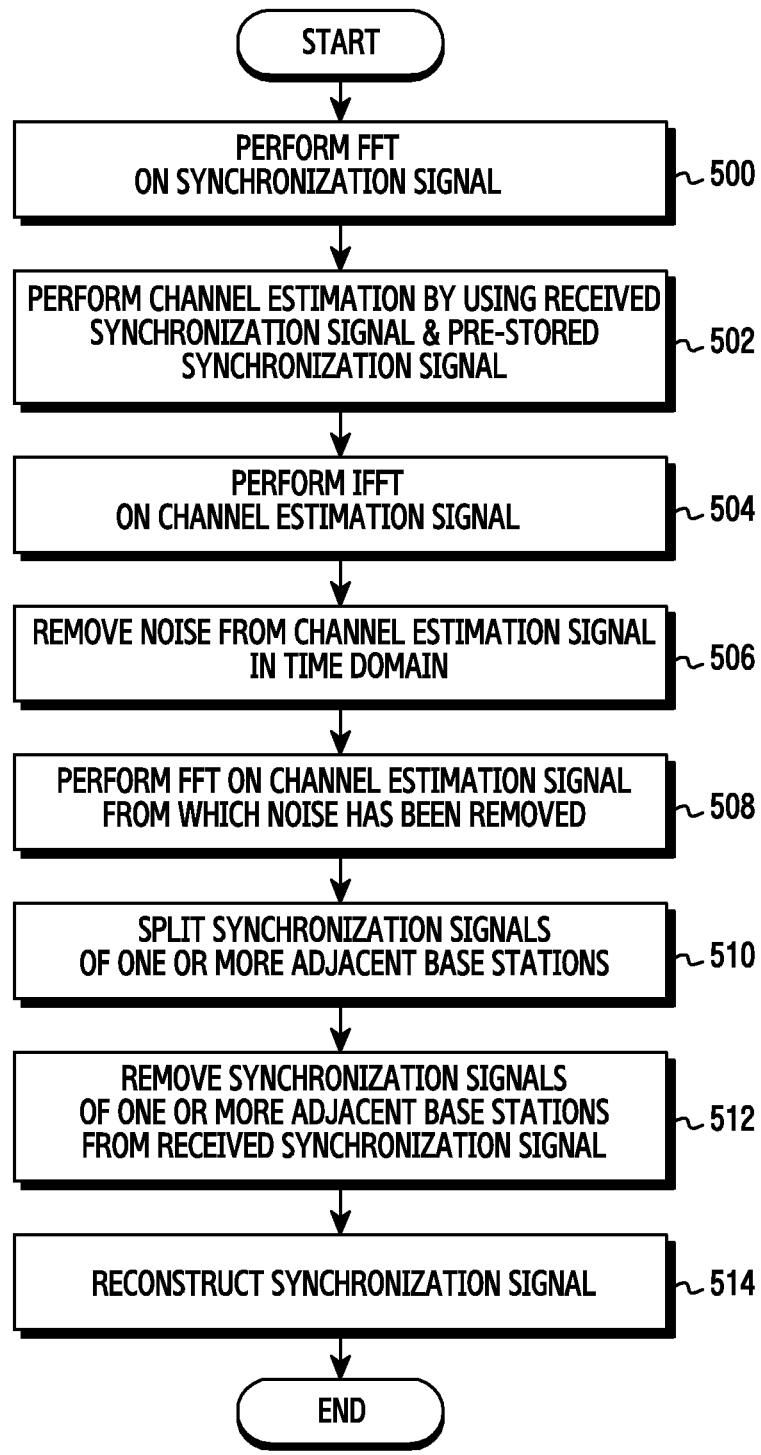
FIG. 5 is a flowchart illustrating the detection of synchronization by a receiver according to an embodiment of the present disclosure.

FIG. 5 is a flowchart illustrating the detection of synchronization by a receiver according to an embodiment of the present disclosure.

Referring to FIG. 5, in step 500, the receiver performs an FFT on a received synchronization signal.

In step 502, the receiver performs channel estimation by using the received synchronization signal and a pre-stored synchronization signal, in a frequency domain. For example, the receiver may perform channel estimation by multiplying the received synchronization signal by the inverse of the pre-stored synchronization signal.

In step 504, the receiver converts a channel estimation signal in the frequency domain into a channel estimation signal in the time domain through an IFFT operation.

In step 506, the receiver removes noise from the estimated channel, in the time domain. For example, the receiver may remove noise by nulling to zero signal taps having noise power values less than a predetermined threshold in the time domain, or by nulling to zero signal taps having lengths at least equal to a maximum length of a channel.

In step 508, the receiver performs an FFT on the channel estimation signal, from which the noise has been removed, in the time domain.

In step 510, the receiver splits synchronization signals of one or more adjacent base stations by using the channel estimation signal, from which the noise has been removed, in the frequency domain.

In step 512, the receiver removes the synchronization signals of the at least one adjacent base station from the received synchronization signal on the basis of the serial IC scheme.

In step 514, the receiver reconstructs the synchronization signal, from which the interference is canceled.

Figure 6:
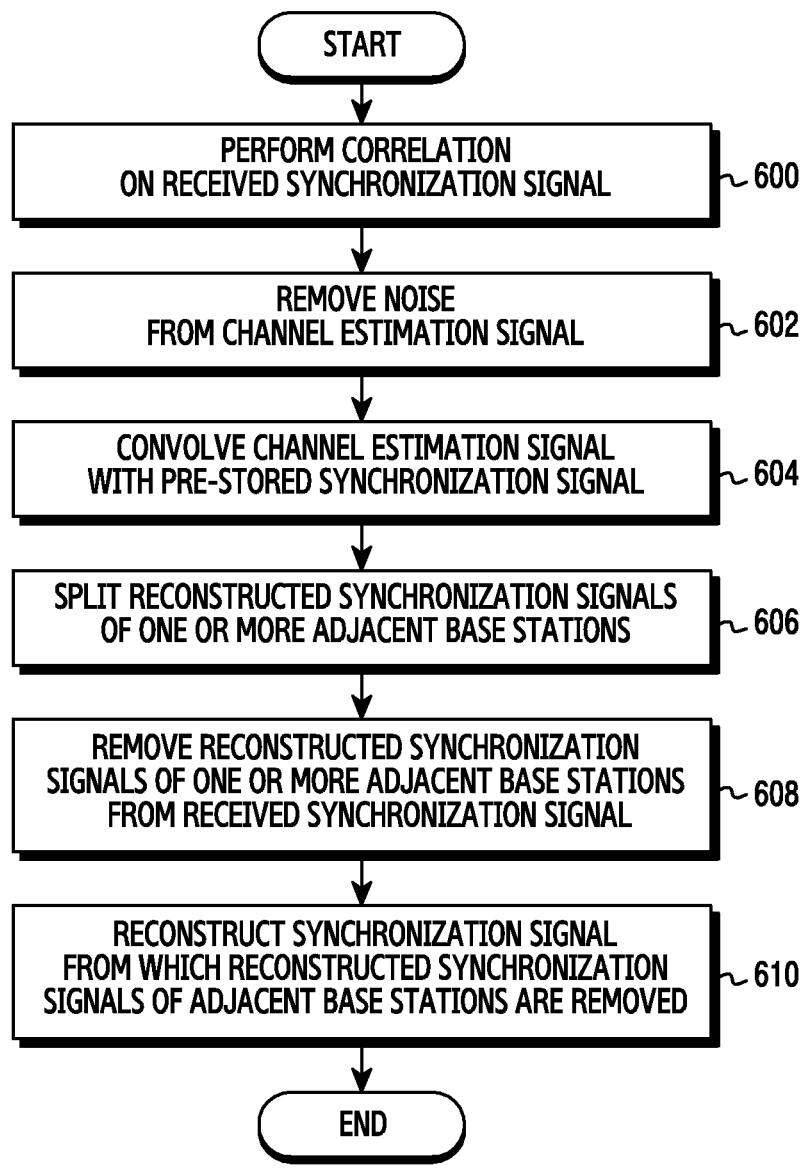
FIG. 6 is a flowchart illustrating the detection of synchronization by a receiver according to an embodiment of the present disclosure.

FIG. 6 is a flowchart illustrating the detection of synchronization by a receiver according to an embodiment of the present disclosure.

Referring to FIG. 6, in step 600, the receiver performs channel estimation by performing correlation on a received synchronization signal.

In step 602, the receiver removes noise from the estimated channel in the time domain. For example, the receiver may remove noise included in a channel by arranging correlation power values and then considering, as channel power, only correlation power having a higher priority than that of a threshold, or by setting a range of a time period for performing correlation to a maximum delay time period.

In step 604, the receiver convolves a channel estimation signal with a pre-stored relevant synchronization signal, in the time domain. Specifically, the receiver may reconstruct (or recover) a synchronization signal by convolving the channel estimation signal with the pre-stored relevant synchronization signal.

In step 606, the receiver splits synchronization signals of at least one adjacent base station by using the channel estimation signal, from which the noise has been removed, in the time domain.

In step 608, the receiver removes the reconstructed synchronization signals of the one or more adjacent base stations from the received synchronization signal on the basis of the serial IC scheme.

In step 610, the receiver reconstructs the synchronization signal, from which the interference is canceled.

Figure 7:
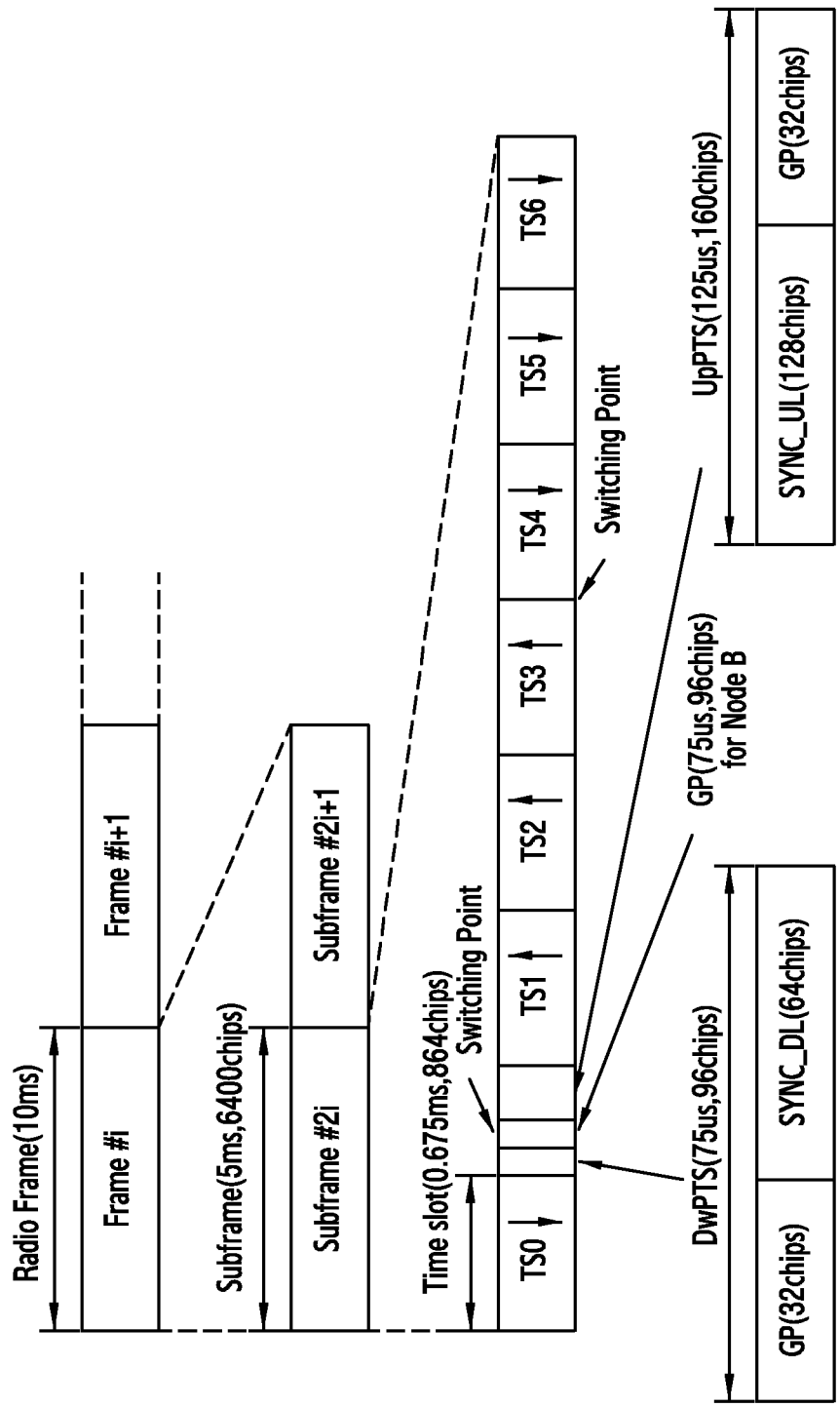
FIG. 7 is a diagram illustrating a structure of a frame of TD-SCDMA according to an embodiment of the present disclosure.

FIG. 7 is a diagram illustrating a structure of a frame of TD-SCDMA according to an embodiment of the present disclosure.

Referring to FIG. 7, the frame of TD-SCDMA has a length of 10 ms. Multiple subframes are grouped to form one frame. One frame is divided into two subframes each having a length of 5 ms. Here, when a chip rate of the TD-SDCMA system is equal to 1.28 Megachips per second (Mcps), 5 ms corresponds to 6400 chips. Specifically, one subframe has a length of 6400 chips.

A DL signal and a UL signal are separated from each other by a switching point, and multiple switching points exist within one subframe. Among seven time slots, TS0 is always assigned to DL, and TS1 is always assigned to UL. A switching point always exists between the two time slots TS0 and TS1. The remaining time slots are freely assigned to UL and DL in order to support asymmetric traffic. For example, a total of four time slots TS0, TS4, TS5 and TS6 area assigned to DL, and three time slots TS1, TS2 and TS3 are assigned to UL. Another switching point for switching between UL and DL exists after TS1, TS2 and TS3.

Meanwhile, three special time slots Downlink Pilot Time Slot (DwPTS), Uplink Pilot Time Slot (UpPTS) and Guard Period (GP) exist between the time slot TS0 and the time slot TS1.

(DwPTS is a DL pilot time slot and is used for DL synchronization and an initial cell search. The time slot DwPTS includes a total of 96 chips, in which 32 chips are used as a GP for preventing a DL signal of TS0 from interfering with SYNC_DL and 64 chips are used for SYNC_DL, which is a signal used for synchronization. Different base stations may be distinguished from each other by using 32 different SYNC_DL codes (i.e., DL synchronization codes).

UpPTS includes 160 chips, in which 32 chips are used for a GP and the remaining 128 chips are used for SYNC_UL. The signal SYNC_UL is used for a procedure for an UL initial synchronization and random access, and is also used for measurement of an adjacent cell during handover. 256 different existing SYNC codes are divided into 32 groups, in which one group includes 8 different SYNC codes. Specifically, one base station may have 8 SYNC codes included in each group.

The GP, which is a guard period between a UL signal and a DL signal, includes 96 chips and has a length of 75 us. In the TD-SCDMA system, the radius of a cell may be determined by link budget due to attenuation of a wireless signal. Further, since delay occurring within the cell should not cause DL and UL to interfere with each other, the radius of the cell in the TD-SCDMA system may also be limited by the length of the GP in order to prevent the delay from causing DL and UL to interfere with each other.

Figure 8:
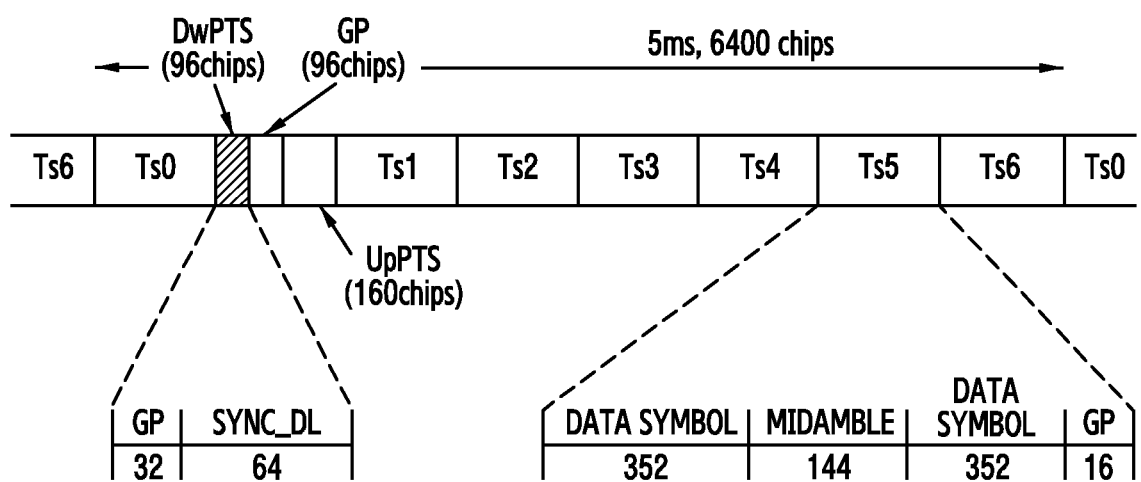
FIG. 8 is a diagram illustrating a structure of a frame of TD-SCDMA according to an embodiment of the present disclosure.

FIG. 8 is a diagram illustrating a structure of a frame of TD-SCDMA according to an embodiment of the present disclosure.

Referring to FIG. 8, DwPTS, GP, and UpPTS signals are inserted between TS0 and TS1 from among seven time slots of the frame of TD-SCDMA, and each time slot includes a data symbol, a midamble, and a data symbol, in this order.

A time slot within a subframe includes, in the middle thereof, a midamble (128 chips for codes+16 chips for a GP=144 chips) used for power measurement and for maintaining UL synchronization. Next, the time slot includes a GP (=16 chips) for preventing interference with a burst. Data symbol (each having 352 chips) exist before and after the midamble.

As illustrated in FIG. 8, in the TD-SCDMA system, a DL pilot signal DwPTS is periodically transmitted at intervals of 5 ms (i.e., in every subframe). A midamble signal included between two sets of data in each time slot may be used as a pilot signal. The DL pilot signal DwPTS, which is a common pilot channel, includes a random code of 64 chips referred to as "SYNC_DL," and an identical code is used in one cell. The midamble, which is a dedicated pilot channel, may include a random code of 128 chips, and may be used to simultaneously transmit multiple codes generated by cyclically shifting one basic code.

Figure 9:
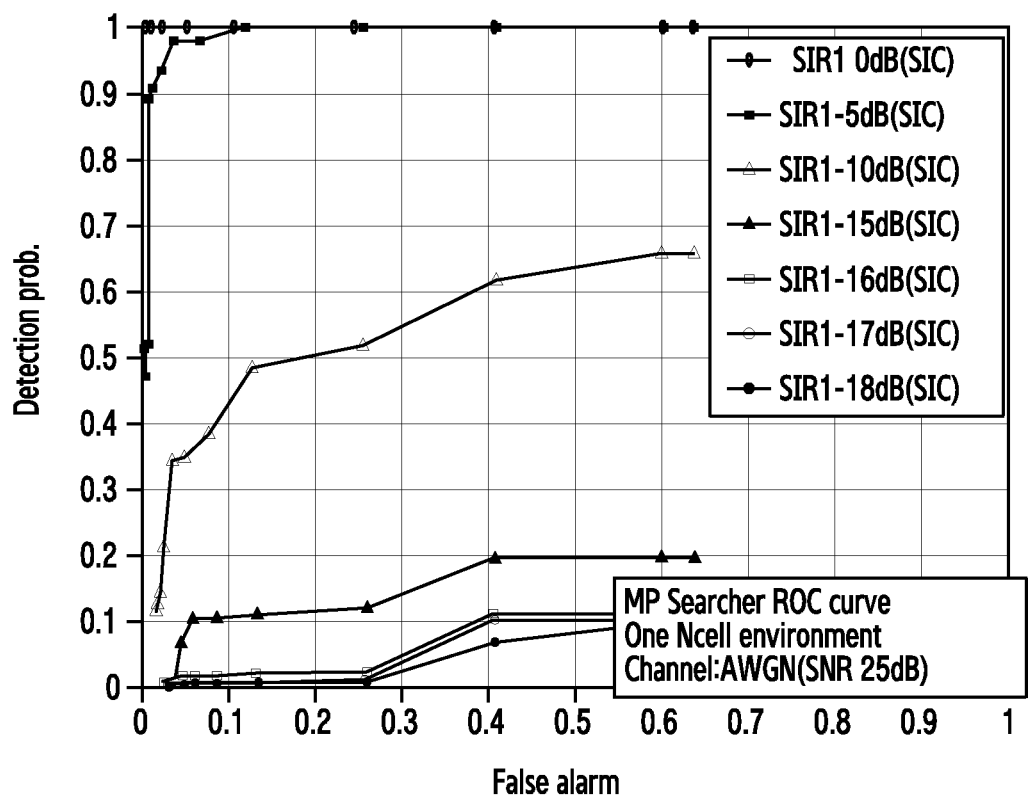
FIG. 9 is a graph illustrating a result of a simulation according to an embodiment of the present disclosure.

FIG. 9 is a performance graph illustrating a result of the simulation of an example in which IC is not applied to a synchronization signal according to an embodiment of the present disclosure.

Figure 10:
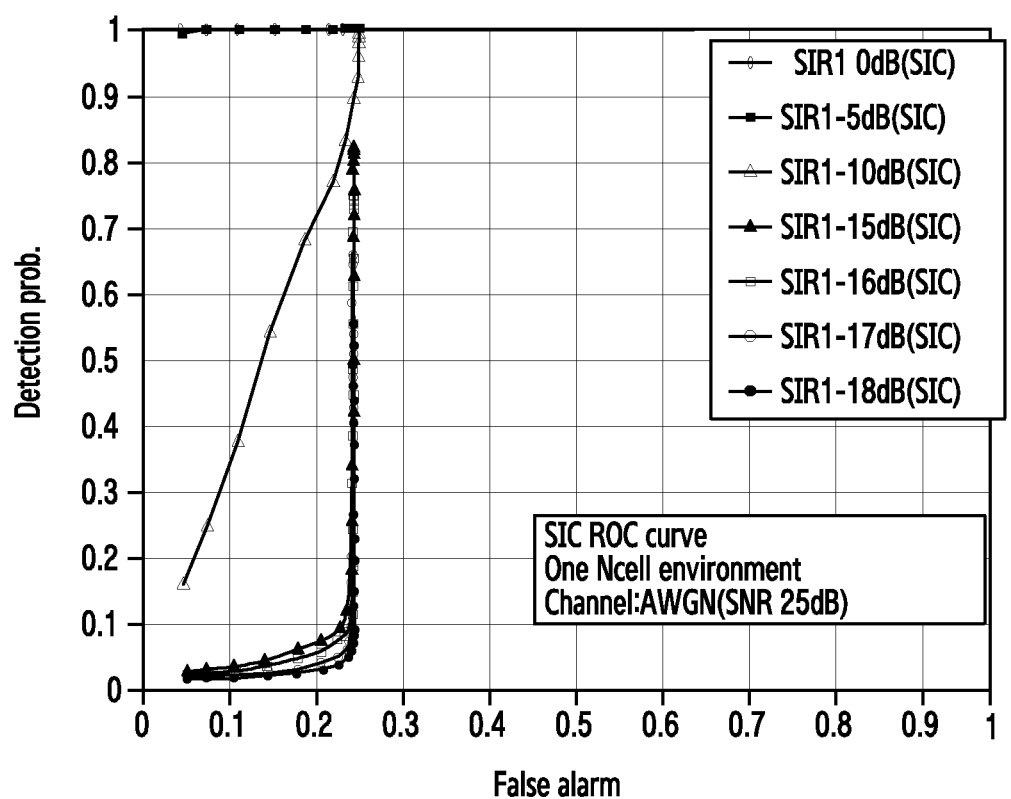
FIG. 10 is a graph illustrating a result of a simulation according to an embodiment of the present disclosure.

FIG. 10 is a performance graph illustrating a result of a simulation of an example in which IC is applied to a synchronization signal according to an embodiment of the present disclosure.

As shown by a comparison of the performance graph of FIG. 9 with that of FIG. 10, detection performance, as indicated by Detection Probability on the y-axis of the graphs of FIGS. 9 and 10, respectively is improved when interference cancellation is applied to a synchronization signal, as shown in FIG. 10. In FIGS. 9 and 10, "SIR" refers to a signal to interference ratio, "SNR" refers to a signal to noise ratio, "SIC" refers to successive interference cancellation, "ROC" refers to region of convergence, and "MP" refers to a multipath.

A receiver includes a chipset configured to cancel, based on a serial interference cancellation, an interference signal included in a synchronization signal received from at least one adjacent cell and detect the synchronization based on the synchronization signal, from which the interference signal is canceled.

Methods according to various embodiments of the present disclosure may be implemented by hardware, software, or a combination thereof.

In the implementation of software according to an embodiment of the present disclosure, a computer-readable storage medium for storing one or more programs (software modules) may be provided. The one or more programs stored in the computer-readable storage medium may be configured for execution by one or more processors within the electronic device. The at least one program may include instructions that cause the electronic device to perform methods according to embodiments of the present disclosure.

The programs (software modules or software) may be stored in non-volatile memories including, for example, a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), other types of optical storage devices, or a magnetic cassette. Alternatively, any combination of some or all of the above-described memories may form a memory in which the program is stored. Further, a plurality of such memories may be included in the electronic device.

In addition, the program may be stored in an attachable storage device capable of accessing the electronic device through a communication network such as the Internet, an intranet, a Local Area Network (LAN), a Wide LAN (WLAN), a Storage Area Network (SAN), or any combination thereof. Such a storage device may access the electronic device via an external port.

Further, a separate storage device on the communication network may access a portable electronic device.

As described above, synchronization detection performance can be improved by canceling intra-frequency interference included in a synchronization signal by using an IC technique.

Also, in various embodiments of the present disclosure, an IC scheme is applied to a signal SYNC_DL, and thereby a window range can be increased that a synchronization-maintaining scheme using a midamble can estimate.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and any equivalents thereof.

What is claimed is:

1. A receiver for detecting synchronization in a wireless communication system, the apparatus comprising:
    a reception unit that receives a synchronization signal including an interference signal from at least one adjacent cell; and
    a synchronization detector that cancels the interference signal included in the synchronization signal based on a serial interference cancellation and an estimated channel from which noise is removed, and detects the synchronization based on the synchronization signal, from which the interference signal is canceled,
    wherein the synchronization detector comprises:
        a channel estimation module that estimates a channel;
        a noise removal module that removes the noise from the estimated channel; and
        a reconstruction module that reconstructs at least one of a synchronization signal and an interference signal based on the estimated channel, from which the noise is removed.

2. The receiver as claimed in claim 1, further comprising an interference cancellation module that cancels the reconstructed interference signal from the reconstructed synchronization signal.

3. The receiver as claimed in claim 1, wherein the channel estimation module comprises:

a fast fourier transform (FFT) operation unit that performs an FFT operation on the received synchronization signal; and
at least one multiplier that multiplies the received synchronization signal by an inverse of a synchronization signal in a frequency domain.

4. The receiver as claimed in claim 1, wherein the noise removal module comprises:
at least one inverse fast fourier transform (IFFT) operation unit that performs an IFFT operation on the estimated channel; and
a processing unit that, in a time domain, compares power values of signal taps of the estimated channel with a threshold and nulls to zero signal taps having power values less than the threshold.

5. The receiver as claimed in claim 1, wherein the noise removal module comprises:
at least one IFFT operation unit that performs an IFFT operation on the estimated channel; and
a processing unit that, in a time domain, nulls to zero signal taps having lengths exceeding a maximum length of the channel among signal taps of the estimated channel.

6. The receiver as claimed in claim 1, wherein the channel estimation module comprises at least one correlator that determines a correlation power of the received synchronization signal.

7. The receiver as claimed in claim 1, wherein the noise removal module comprises a processing unit that arranges correlation power values of the received synchronization signal and determines a predetermined number of correlation power values in order of the arrangement.

8. The receiver as claimed in claim 6, further comprising a processing unit that sets, to a maximum delay, a time period according to which the correlation power of the received synchronization signal is determined.

9. The receiver as claimed in claim 1, wherein the synchronization signal is located in a downlink pilot time slot (DwPTS), which discriminates between cells, between a first time slot and a second time slot, and
wherein the DwPTS comprises a guard period (GP) of 32 chips and a SYNC_DL of 64 chips.

10. A method for detecting synchronization by a receiver in a wireless communication system, the method comprising:
receiving a synchronization signal including an interference signal from at least one adjacent cell;
canceling the interference signal included in the synchronization signal based on a serial interference cancellation and an estimated channel from which noise is removed; and
detecting the synchronization based on the synchronization signal, from which the interference signal is canceled,
wherein canceling the interference signal included in the synchronization signal comprises:
estimating a channel;
removing the noise from the estimated channel; and
reconstructing at least one of a synchronization signal and an interference signal based on the estimated channel, from which the noise is removed.

11. The method as claimed in claim 10, further comprising canceling the reconstructed interference signal from the reconstructed synchronization signal.

12. The method as claimed in claim 10, wherein estimating the channel comprises:
performing a fast fourier transform (FFT) operation on the received synchronization signal; and
multiplying the received synchronization signal by an inverse of a synchronization signal in a frequency domain.

13. The method as claimed in claim 10, wherein removing the noise from the estimated channel comprises:
performing an inverse fast fourier transform (IFFT) operation on the estimated channel;
comparing power values of signal taps of the estimated channel with a threshold in a time domain; and
nulling to zero signal taps having power values less than the threshold.

14. The method as claimed in claim 10, wherein removing the noise from the estimated channel comprises:
performing an IFFT on the estimated channel; and
nulling to zero signal taps having lengths exceeding a maximum length of the channel among signal taps of the estimated channel, in a time domain.

15. The method as claimed in claim 10, wherein estimating the channel comprises determining a correlation power of the received synchronization signal.

16. The method as claimed in claim 10, wherein removing the noise from the estimated channel comprises:
arranging correlation power values of the received synchronization signal; and
determining a predetermined number of correlation power values in order of the arrangement.

17. The method as claimed in claim 15, comprising setting, to a maximum delay, a time period according to which the correlation power of the received synchronization signal is determined.

18. A receiver for detecting synchronization in a wireless communication system, the receiver comprising:
a chipset configured to:
cancel, based on a serial interference cancellation and an estimated channel from which noise is removed, an interference signal included in a synchronization signal received from at least one adjacent cell; and
detect the synchronization based on the synchronization signal, from which the interference signal is canceled,
wherein canceling the interference signal included in the synchronization signal comprises:
estimating a channel;
removing the noise from the estimated channel; and
reconstructing at least one of a synchronization signal and an interference signal based on the estimated channel, from which the noise is removed.

* * * * *